Figure 3:
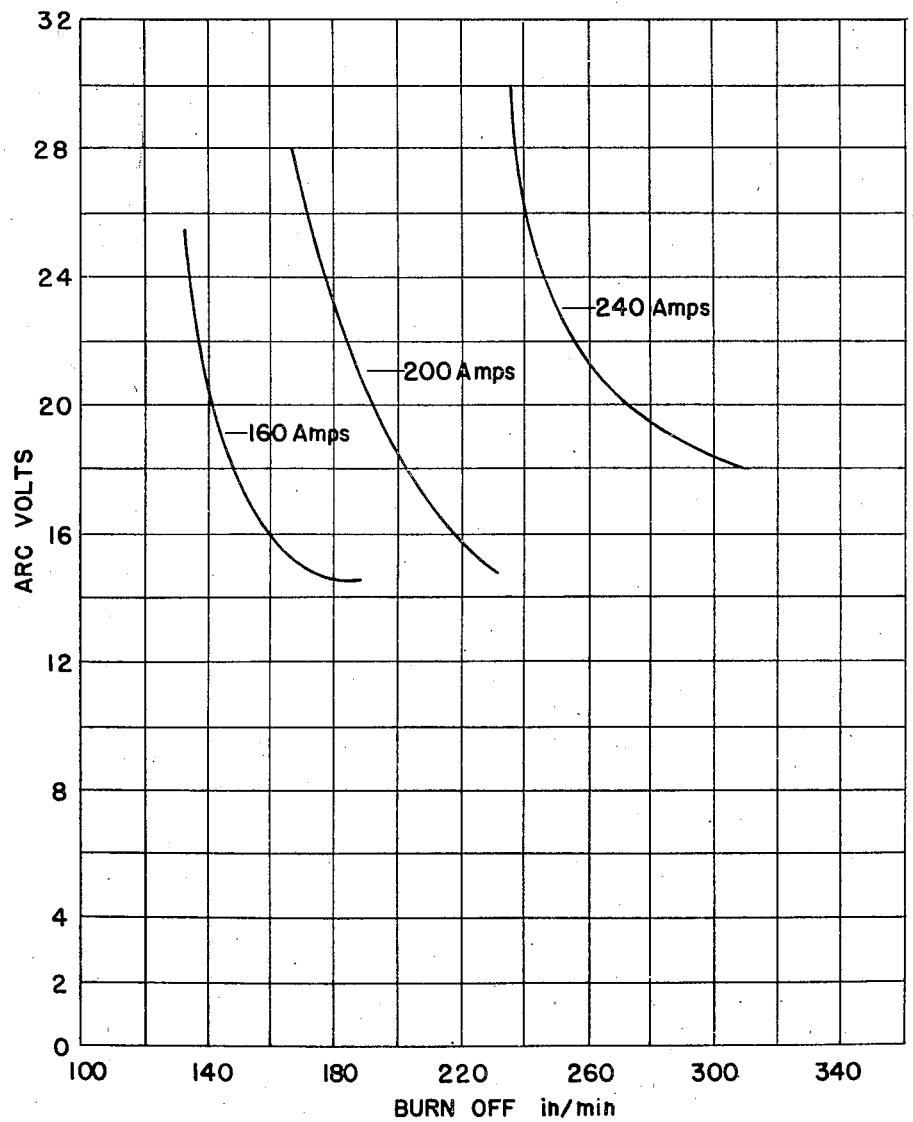

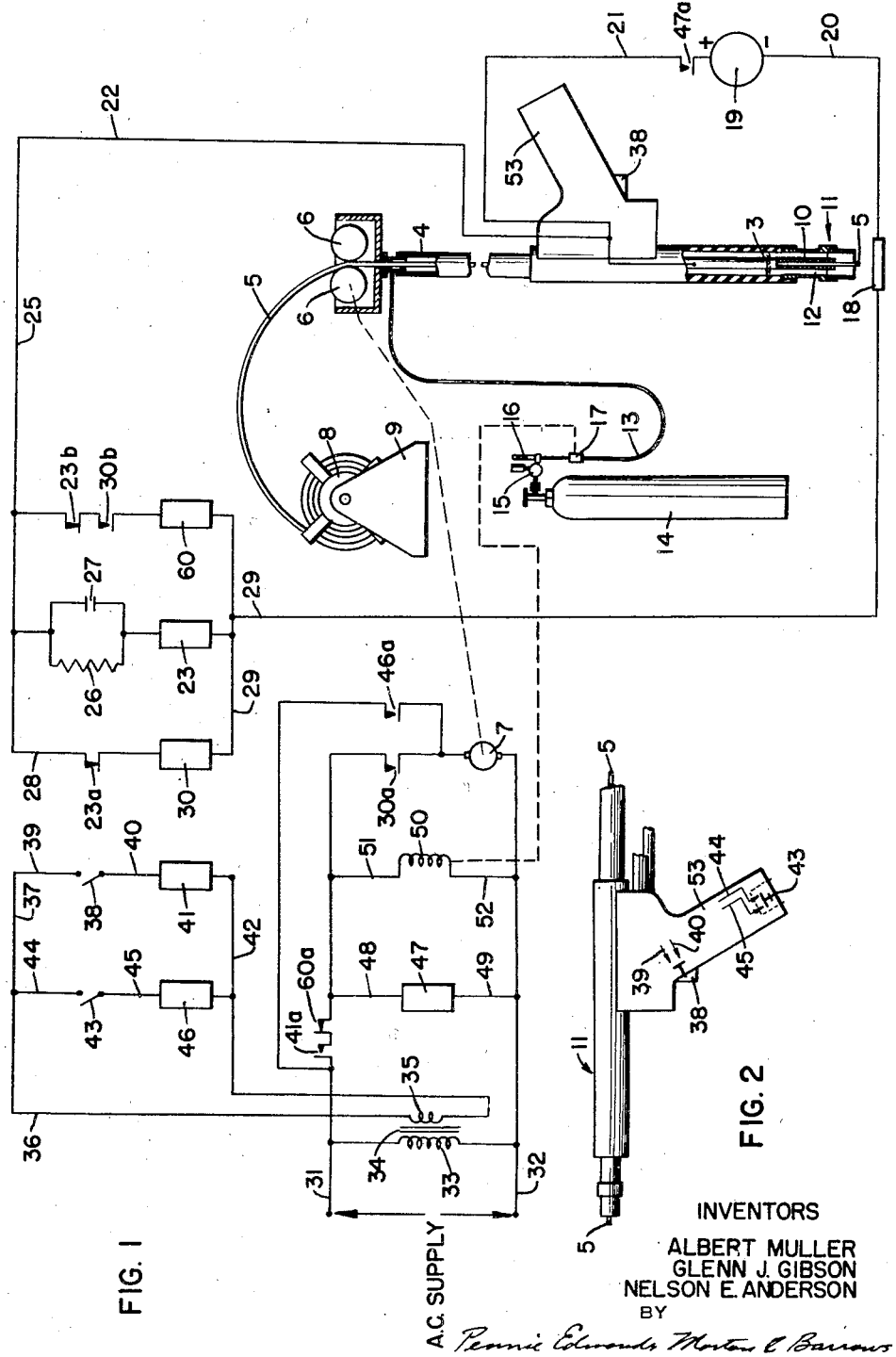

Patented Apr. 18, 1950

2,504,868

UNITED STATES PATENT OFFICE 2,504,868

ELECTRIC ARC WELDING

Albert Muller, Plainfield, Glenn J. Gibson, Somerville, and Nelson E. Anderson, Scotch Plains, N. J., assignors to Air Reduction Company, Incorporated, New York, N. Y., a corporation of New York Application January 21, 1949, Serial No. 72,022

12 Claims. (Cl. 219—8)

1

This invention relates to arc welding methods and apparatus and more particularly to methods and apparatus for gas shielded metal arc welding.

This invention is of particular importance as applied to what may be characterized as semi-automatic welding wherein a bare filler wire constituting a consuming electrode is fed automatically to a hand gun held by the operator. In such a process the operator moves the gun manually so that the point of the consuming wire electrode follows the seam to be welded and as the welding operation proceeds the filler wire is fed automatically into and through the hand gun held by the operator.

This invention involves new concepts of a combination of factors including current density, gas shielding, filler wire feed speeds, and direct current reverse polarity, whereby new and greatly improved results are obtained, particularly as applied to semi-automatic welding.

In general, the new process involves the feeding of filler metal in wire form through a suitable holder, the filler metal being preferably in the form of a bare wire. The filler metal carries the welding current and an arc is maintained between the end of the wire and the work. Power may be supplied from a standard direct current welding generator. Standard direct current welding generators, including constant potential multiple operator units are suitable, for such generators provide the desired drooping voltage-current characteristic for the arc.

This invention involves improved apparatus responsive to electrical conditions at the point of welding, i. e., between the electrode and the work for automatically controlling the feed of the filler wire and this invention also involves the use of means for providing a current density in the filler wire electrode many times that ordinarily employed in gas shielded metal arc welding, whereby the filler wire is consumed at a very high rate, i. e. at a rate of at least 100 inches per minute for filler wires having a diameter of $\frac{1}{8}''$ to $\frac{3}{32}''$ or smaller.

Other features contributing to the success of this invention are the use of a gas shield for the arc, preferably an inert monatomic gas such as argon or helium, and the employment of direct current reverse polarity. It has been discovered that if these conditions are provided, the welding operation is greatly improved and the control apparatus necessary for insuring the desired automatic action can be greatly simplified. Thus it is not necessary to employ variable speed drive for the consuming electrode—a simple constant

2 speed drive is all that is required, because with the improved welding operation, involving a high rate of speed for the filler wire and the employment of high current density commensurate with this high rate of feed, the regulation of the arc length is very rapid and automatic. Thus any unsteadiness in the hand of the operator as he guides the tool along the seam is compensated for rapidly and automatically at the arc itself without the necessity for varying the rate of feed of the wire to the hand gun. Furthermore the use of such high current density with corresponding rapid feed of the filler wire, with the arc shielded by an inert gas and with reverse polarity at the arc. insures the production of a substantially perfect welded joint under all conditions, for the filler metal is projected axially from the electrode in a smooth stream of droplets or spray with sufficient force to place the metal just where it is wanted, such as the root of otherwise inaccessible joints, and overhead or vertically positioned joints. Under such conditions this smooth, projected type transfer occurs, for example with $\frac{1}{16}''$ aluminum wire at about 160 amperes or higher, i. e., at a current density of at least 52,000 amperes per square inch. The required current density varies for different materials and wire size but in general the current density should be such as to consume the wire at an average rate of at least 100'' per minute.

One of the objects of this invention is to provide improved wire feed control apparatus responsive to electrical conditions obtaining between the electrode and the work, and to provide constant speed feed of the filler wire, with this wire being fed automatically at constant speed while the welding operation proceeds at normal welding voltage at the arc, the feeding of the wire being automatically interrupted whenever the welding voltage is substantially below the normal value as when a short circuit condition is approached. Our improved apparatus also prevents automatic feeding of the filler wire when either open circuit or short circuit conditions obtain between the electrode and the work.

Other features of this invention include improved means for controlling the application of welding generator voltage to the electrode and the work preliminary to the welding operation, improved means for insuring safe low voltage conditions in a control circuit at the hand gun and improved means for simultaneously controlling the supply of shielding gas and the application of welding generator voltage to the electrode and the work.

It has been found that in using this invention the best results are obtained when the inert gaseous medium is supplied in such a manner as to form a substantially non-turbulent envelope of gas shielding the arc. In general, this result may be obtained by feeding the gas in such a manner that it flows axially in the general direction of the wire electrode with substantially no circumferential or whirl velocity component. For example, it has been found that if the gas flow has any substantially circumferential component about the electrode, the gas as it emerges from the welding head in the vicinity of the arc, entrains air to such an extent that the air produces a deleterious effect on the weld.

The various objects and advantages of this invention may be best understood by considering the following detailed description of the illustrative embodiment of the invention shown in the accompanying drawing in which Fig. 1 is a diagrammatic illustration of a welding apparatus embodying the invention;

Fig. 2 is a diagrammatic representation of a form of welding tool or hand gun suitable for the purposes of this invention as applied to semi-automatic welding; and Fig. 3 shows how the burn-off rate varies with arc voltage for several constant values of arc current in the high current density range, the electrode being a 1/16" aluminum wire and the arc being argon shielded.

Referring to the drawings, 5 indicates the wire electrode which is withdrawn from a reel 8 supported in a bracket 9, the wire being fed by a pair of feed rolls 6 driven by motor 7. The feed rolls 6 serve to feed the wire electrode through a cable or conduit 4 of fixed length interconnecting the wire feed mechanism with the welding head. A gas cylinder 14 serves to supply the inert shielding gas for shielding the arc, the gas line including a pressure reducing valve 15, a flow meter 16, a solenoid operated valve 17 and a tube 13 leading from the valve 17 to the conduit 4. The gas flows through the conduit 4 in a space between the shell of the conduit and the wire electrode 5 which is fed through the conduit 4 by the feed rolls 6.

A welding generator or other suitable source of welding current 19 is connected by a conductor 20 to the metal workpiece 18, the other pole or generator is connected through conductor 21 to the current pickup shoe 10 in the welding head 11 and shoe 10 makes electrical contact with the end of the wire electrode 5. A line switch 47a is shown connected in series in the conductor 21.

The source of welding current 19 is preferably a direct current welding generator providing the usual drooping voltage-current characteristic for the arc, and the negative terminal of the generator is connected to the workpiece and the positive terminal to the wire electrode, thus providing what is characterized as reverse polarity for the welding arc.

In the apparatus illustrated in the accompanying drawing, the connection of the source of welding current with the wire electrode and with the workpiece, the feeding of the wire electrode, and the supply of shielding gas are controlled by several relays and switch contacts. The apparatus includes a relay 30 having its operating coil connected across the electrode and the workpiece so as to be directly responsive to voltage between these elements. Thus the relay 30 is connected to the workpiece 18 by a wire 29 and it is connected to the electrode through switch contacts 23a and wires 28, 25 and 22. The relay 30 is operable when energized to close the contacts 30a in a circuit represented by wires 31 and 32 connected to a suitable power source such as an ordinary 110 volt source of alternating current, and 30b in series with operating coil of relay 60. The wire feed motor 7 is connected in this circuit represented by wires 31 and 32, the motor being in series with the switch contacts 30a of relay 30 and also in series with contacts 41a of a control relay 41 and contacts 60a of control relay 60. The control relay 41 has its operating coil connected across a suitable source of reduced voltage, such as the secondary winding 35 of a transformer 34 having its primary winding 33 connected across the supply leads 31 and 32. The relay 41 is connected to this secondary winding 35 of the transformer through wire 40, manually operable switch contacts 38, wire 39 and wires 37 and 42. The manually operable switch contacts 38 are preferably mounted in the handle of the welding gun as best illustrated in Fig. 2, these contacts constituting a pressure switch biased to its open position except when pressure is applied thereto by hand to maintain the contacts closed.

The control circuit illustrated in Fig. 1 of the accompanying drawing also includes a power relay 47 for actuating the line switch contacts 47a in the welding circuit. The operating coil of the power relay 47 is connected across the power circuit wires 31 and 32 so that this relay is energized as soon as contacts 41a are closed in response to operation of the relay 41 controlled by the hand switch 38. The control circuit also includes what may be characterized as a lockout relay 23 connected to wire 25 through a parallel circuit comprising a resistance 26 and a condenser 27, and also connected to the workpiece 18 through wire 29. The relay 23 is thus responsive to voltage between the wire electrode and the workpiece, and this relay is of such a nature that it is effectively energized only when the voltage between the wire electrode and the workpiece is at or near open circuit voltage of the welding generator. Relay 23 controls contacts 23a in series with the operating coil of the relay 30, and 23b in series with the operating coil of the relay 60. Relay 60 is a time delay relay of such a nature that it is effectively energized when the voltage between the wire electrode and workpiece exceeds normal welding voltage. Its time delay operation need be only great enough to prevent operation during the time that relay 23 is closing when the trigger is first depressed.

With the apparatus connected and arranged as described above it will be understood that when the operator grasps the handle 53 of the welding head 11, the pressure switch 38 is operated to close its contacts, thereby energizing the control relay 41 which closes contacts 41a in the auxiliary power circuit represented by the wires 31 and 32. Current is thus supplied to the operating coil of the relay 47 to cause this relay to close the line contacts 47a in the welding circuit whereby the voltage of the welding current source is impressed across the electrode 5 and the metal workpiece 18 through leads 20, switch contacts 47a and lead 21. Simultaneously current is supplied to the operating solenoid 50 of the solenoid valve 17 in the gas supply line whereby inert gas flows from the tank 14 to and through the conduit 4 and into the welding head from which it emerges to form a protective shield of gas excluding air from the region between the end of the electrode and the workpiece, as soon as these elements are brought into close proximity to each other. As soon as the welding potential is impressed across the welding electrode and the workpiece, the full potential of the welding source is available to energize the lockout relay 23 which immediately opens its contacts 23a and 23b and prevents the relays 30 and 60 from being energized as long as this open circuit condition obtains in the welding circuit. The operator then moves the hand gun until the electrode 5 touches the workpiece and then withdraws the same to strike an arc between the welding electrode 5 and the workpiece. When the wire electrode touches the workpiece, the lockout relay 23 is short circuited, thus permitting contacts 23a to close and thereby connect the control relay 30 across the electrode and the workpiece. Contacts 23b also close. As soon as the arc is drawn and normal welding voltage exists between the electrode and the workpiece, the control relay 30 is energized to close its contacts 30a in the control circuit including the wire electrode feed motor 7, and contacts 30b in series with relay 60. This motor then starts and continues to operate at a constant rate of speed to feed the electrode wire 5 toward the arc. This condition obtains as long as normal welding voltage exists between the electrode and the workpiece. Whenever short circuit conditions are approached in the welding circuit, the control relay 30 is deenergized, thus opening the circuit to the feed motor 7 and stopping the feed of the wire electrode to the hand gun or welding head. The feeding of the electrode is automatically resumed as soon as the welding voltage increases to a value above this value near the short circuit voltage. Whenever the voltage across the arc exceeds the normal welding value, the relay 60 becomes energized to open the normally closed contacts 60a, thereby disconnecting the feed motor 7 and stopping the wire feed, opening contactor 47, and deenergizing the valve solenoid 50. As shown in the accompanying drawing, the control relay 30 is preferably connected so as to be responsive directly to the voltage conditions obtaining across the arc. This arrangement is preferable to having this control relay merely connected across the terminals of the source of welding current because it eliminates any effect which might otherwise occur because of the substantial voltage drop in the leads connecting the source of welding current to the wire electrode and the workpiece.

It will be understood that as long as the pressure switch 38 on the handle of the hand gun is maintained closed, the solenoid valve controlling the supply of inert gas remains open to insure a steady supply of shielding gas to the welding head, except during the brief intervals when relay 60 is energized. Whenever this manually operable switch is released the contacts 38 open to deenergize the control relay 41 whereby contacts 41a open to deenergize the solenoid valve, and to deenergize the power relay 47, thereby interrupting the supply of gas to the welding head and disconnecting the source of welding current by opening the line contacts 47a controlled by the relay 47.

The power relay 47 and the line contacts 47a may be omitted if desired, in which event the lockout relay 23 will be energized as soon as the electrode and the workpiece are connected to the source of welding current by any other suitable means. For most applications, however, it is preferable to employ the power relay 47 for controlling the line contacts 47a, the arrangement being such that these contacts 47a operate to connect the source of welding current to the electrode and workpiece at the same instant that the supply of gas to the welding head is initiated by closing the control switch 38, this single control switch thus serving the purpose of simultaneously controlling both of these operations. If, because of accidental failure of the wire feed, or for any other reason, the arc becomes too long, relay 60 becomes energized to open its contacts 60a to deenergize power relay 47 and open the welding generator circuit thereby extinguishing the arc.

It will be understood that relay 23 is made so that it is sensitive to open circuit or near open circuit voltage only, whereas relay 60 operates to a voltage slightly higher than normal arc voltage. Relay 60 can be energized only after the arc has been established and when for some reason the arc is too long. Under such conditions relay 60 is energized to open its contacts 60a and this deenergizes power relay 47 to open the line contacts 47a. The opening of contacts 60a also deenergizes the solenoid 50 to close the solenoid valve 17, and to interrupt the supply of current to the wire feed motor 7. If the trigger switch 38 is released at this point, all the controls return to their normal starting condition as previously described. However, if the trigger is held closed, since the welding voltage is removed from the circuit by the opening of line switch 47a, relay 60 will immediately be deenergized again. The contactor relay 47 will then be energized again and the gas valve 17 will open, and normal starting conditions are reestablished. It will be noted that the wire feed cannot be interrupted without simultaneously opening the contactor 47a and extinguishing the arc.

It is also desirable to provide a jog switch 43 on the handle of the hand gun, this jog switch being connected in series with the operating coil of relay 46 and contacts 46a in an auxiliary circuit short-circuiting the switch contacts 41a, 60a, and 30a. Thus when the jog switch 43 is closed, the relay 46 is energized through wires 42, 45, 44 and 36 to supply current to the wire feed motor 7 through contacts 46a regardless of whether the wire electrode and the workpiece are connected in closed circuit with the source of welding current. This jog switch accordingly serves as a means for feeding the electrode wire into the welding head 11 when the welding circuit is open, such feeding of the wire being useful in adjusting the point of the wire electrode preliminary to initiating a welding operation.

The resistance 26 and capacitor 27 connected to the operating coil of the lockout relay 23 insure quick action of this relay so that it will be deenergized rapidly under the short circuit condition obtaining when the electrode is touched to the metal workpiece preliminary to striking the arc. This insures prompt reclosing of the contacts 23a controlling the supply of current to the control relay 30.

As stated above, an outstanding feature of this invention is the good uniform metal transfer achieved by using a high current density with a correspondingly high burn-off rate which results in the deposition of a smooth non-porous weld bead with good penetration. The wire feed motor 7 that drives the feed rolls 6 engaging the wire electrode is preferably an adjustable speed motor that operates at constant speed after the desired speed adjustment is made. The adjusted rate of feed of the wire electrode depends upon the size of the electrode and its composition, but in general it may be stated that the wire electrode is fed at a rate of at least 100 inches per minute. The source of welding current, such as the D. C. generator 19 illustrated in the drawing, is likewise adjustable so that a welding current may be supplied to the electrode and the workpiece of sufficient strength to consume the electrode at the rate at which it is being fed toward the arc. For wire feeds of 100 inches per minute and higher this involves relatively high current density in the wire electrode and it has been found that current densities 10 or 12 times those ordinarily employed in gas shielded metal arc welding may be used to advantage. It is preferable to feed the wire electrode toward the workpiece at a constant rate entirely independent of any instantaneous changes in arc length. It has been found that by feeding the wire electrode toward the workpiece at a high rate, with correspondingly high current densities, the arc length is maintained substantially constant by what may be characterized as rapid automatic regulation. Any tendency of the arc to become too long results in a corresponding automatic decrease in the welding current because of the drooping voltage-current characteristic of the source of welding current. In addition, we have discovered that at the high current densities employed with this invention, the burn-off rate of the electrode decreases with increased arc length and arc voltage, even though the power consumption is greater. Thus, for an aluminum electrode, argon shielded (see Fig. 3) even though the current should remain constant in magnitude as the arc length and arc voltage increase, the burn-off rate would be reduced. This combination of factors, i. e., the effect of the drooping voltage-current characteristic and the decrease in burn-off rate with increased arc voltage produces a cumulative effect such that the tip of the wire electrode returns rapidly to its normal average position with respect to the workpiece. Likewise if the arc becomes too short, the current automatically increases because of the drooping voltage-current characteristic of the source of welding current, and the decrease in arc voltage incident to this change also contributes to the increase in the burn-off rate, as indicated in Fig. 3, and these two factors combine to produce a rapid lengthening of the arc length to the desired average value. In this way any slight variations in arc length due to the unsteadiness of the hand of the operator or to any other cause, are automatically compensated for and it is believed that in this way better results are obtained than with any type of wire feed control mechanism that is designed to change the rate of feed in accordance with changes in arc length.

Referring again to Fig. 3 of the drawings, it will be noted that the slope of each curve is less near the bottom thereof than it is near the upper portion thereof. In other words, a small change in arc voltage produces a greater change in burn-off rate in the region near the lower end of each curve than is the case further up on the curve. This is a very desirable characteristic because whenever the arc approaches the short circuit condition, with correspondingly low voltage, the automatic correction is accelerated.

Thus while our invention may be employed for some applications where the rate of wire feed is not constant, e. g. where some means for changing the rate of feed in response to changes in arc length is employed, yet in general we prefer to feed the wire electrode toward the arc at a constant rate, the feed motor being adjusted to provide the particular constant speed most suitable for the size and composition of the wire electrode. Where such constant feed is employed, remarkably good automatic regulation of the arc length is obtained. This automatic regulation attainable with our invention is much superior to any such automatic regulation attainable heretofore using the ordinary low current density. Gas shielded metal arc welding as heretofore practiced has involved the feeding of the wire electrode at a rate substantially below 100 inches per minute and the current density in the wire electrode is much lower than that employed with the present invention. At such low current density the burn-off rate of the wire electrode is substantially proportional to the welding current, and generally increases with increasing arc voltage for any given current. For example, with a $\frac{1}{16}$" aluminum electrode, a welding current of 250 amperes and an arc voltage of 29 volts, the burn-off rate is in the neighborhood of 30 inches per minute and if under these conditions the arc length is increased so that the voltage at the arc becomes 32 volts, the welding current would be in the neighborhood of 238 amperes and the burn-off rate is only 28 inches per minute, whereas the wire is being advanced at the rate of 30 inches per minute. Under these conditions the arc tends to become shorter at the rate of 2 inches per minute.

In contrast with such operating conditions we have found that when high current densities are employed with a correspondingly high rate of wire feed, in excess of 100 inches per minute, an increase in arc length is accompanied by an increase in arc voltage, but even though the welding current remains the same, the burn off rate is less, in spite of the fact that more energy is being expended in the arc. Thus it is apparent that where such high current density is employed, the burn-off rate for a given current does not increase with the arc voltage as is the case where low current density is employed during the welding operation. This unexpected result is most beneficial for it facilitates the automatic regulation of the arc length. The reduction in burn-off rate, even though the arc current remains the same, insures a more rapid shortening of the arc than would otherwise occur whenever the arc length and arc voltage are increased beyond their normal average values. Thus the rate of correction or regulation under such high current density conditions may be as much as ten times the rate of change of arc length that occurs when welding with the usual low current density. At high current densities the slope of the burn-off rate curve is much steeper than for normal current densities and the burn-off rate change is amplified by the fact that at high current densities the burn-off rate varies inversely with the arc voltage. With constant high speed feed of the wire electrode and high current density, the arc length regulation is very rapid and automatic and does not involve any mechanical inertia or hunting as may occur where variable feed is used.

According to this invention the metal transfer across the arc is radically different from the globular drip transfer at ordinary current densities heretofore employed in gas shielded arc welding. The molten metal is projected from the end of the wire and the current density may be high enough to cause the metal transfer to comprise a cone-shaped stream of fine droplets, practically a spray. The projection force is sufficient to overcome gravity and accordingly it is possible to perform satisfactory welding in the overhead, vertical or down hand positions with equally good results.

It has been found that our invention may be used to advantage welding with any of the following metals and alloys:

I. Ferrous metals:
  A. Ferritic:
    1. Plain carbon steel
    2. Alloy steels
  B. Austenitic:
    1. 18% chromium, 8% nickel types
    2. 25% chromium, 20% nickel types II. Non-ferrous metals:
  A. Aluminum and its alloys:
    1. Commercially pure aluminum, type 2S
    2. Aluminum alloys, type 3S
    3. Aluminum alloys, type 43S
    4. Aluminum alloys, type 716
  B. Copper:
    1. Deoxidized copper:
    2. Copper alloys—Phosphor Bronze
    3. Copper alloys—aluminum bronze
  C. Magnesium:
    1. Magnesium alloy—type J1 (6% aluminum, 1% zinc)

It is also believed that our invention can be used to advantage in employing other welding metals and alloys, for example, other ferrous metals such as high manganese steels, high nickel steels, etc., and other non-ferrous metals.

As a typical illustration it has been found that by employing a $\frac{1}{16}$ inch aluminum wire electrode and argon shielding, excellent results are obtained if the wire electrode is fed at a constant rate of 160 inches per minute with a welding current in the range of 130 to 180 amperes, depending on the arc length and the generator setting. In general, it may be stated that for aluminum wire electrodes the preferred relation between the current density D in the electrode and the rate of the wire feed B may be expressed as follows:

$$D = \frac{B}{3} + C$$

where C varies from −10 to +10, where D is the current density in $10^3$ amperes per square inch, and where B is the rate of wire feed in inches per minute, B being at least 100 inches per minute. When electrodes having very low electrical resistance are employed, such as aluminum and copper electrodes, there is no appreciable resistance heating in the length of electrode between the contact shoe and the arc, and even when electrodes having higher electrical resistance are employed, this resistance heating effect may be negligible, for under no circumstances is it necessary to employ resistance heating either to initiate the arc or maintain it. This invention involves metal transfer from the electrode to the arc due almost entirely to the intense heat generated in the arc itself.

It has been found that with an aluminum electrode having a diameter of $\frac{1}{16}$ inch, if this electrode is fed toward the arc at a constant rate of 145 inches per minute, a welding current of 140 amperes with an arc voltage in the neighborhood of 20 volts produces a steady satisfactory welding condition, with argon shielding. Oscillograms indicate that metal globules are transferred across the arc with the electrode held in a horizontal position, the globules being transferred or projected from the end of the electrode to the workpiece at a rate of approximately 34 per second. Thus .071 inch of wire were consumed for each globule thus transferred. It was noted that these globules were large enough to short circuit the arc for an instant as each globule became distorted and was about to leave the electrode. This type of transfer results in a crackling arc and although metal can be deposited in the vertical or overhead positions, it is not the most desirable arc transfer for producing the best appearing and soundest weld beads. By further increasing the current to 160 amperes and the voltage to 23 volts and maintaining the wire feed speed at 145 inches per minute, the arc length was approximately $\frac{1}{4}$ inch and a true projection or spray type of transfer was achieved, the transfer involving the formation of smaller droplets of molten metal passing from the electrode to the workpiece at the rate of 49 droplets per second, thus involving a burn-off rate such that .049 inch of wire were consumed per droplet. These discrete droplets were projected from the wire electrode to the workpiece without producing any short circuiting of the arc. Thus in this case it was observed that the molten metal was projected axially from the end of the electrode rather than merely following an arc across the shortest path from the electrode to the work, the fine discrete droplets forming a sharply defined core of transferring metal. In general, it may be stated that the current density should be sufficient to project metal horizontally across an arc, i. e. from an electrode held in the horizontal position to a workpiece disposed in a vertical position.

If the current strength or density is not high enough to project the molten metal axially from the wire electrode to the workpiece in the form of a visible spray of fine discrete droplets within the gas shield (or in the case of aluminum electrodes of $\frac{1}{16}''$ diameter a globule transfer at the rate of approximately 34 per second) the results are not satisfactory. For example, with a $\frac{1}{16}''$ aluminum electrode fed at the rate of 145 inches per minute, with argon shielding, if the current is reduced to 120 amperes with an arc voltage of 18 volts, it was found that when the electrode was held in the horizontal position an arc of approximately $\frac{1}{4}''$ length was maintained but no metal transfer from the horizontal electrode to the vertical plate occurred. Instead large globules formed on the end of the electrode and dropped off under the influence of gravity. Each time such a globule left the end of the electrode there was a momentary arc voltage rise and the oscillogram showed that these large globules were released at the rate of only 3.6 globules per second for these particular welding conditions.

According to our invention, the strength of the welding current is such that as the electrode is fed toward the work at a rate of at least 100 inches per minute, the weld metal is projected axially from the end of the electrode in the form of a sharply defined core composed of discrete droplets. This characteristic form of transfer peculiar to our invention is suddenly evident as the welding current is increased to the desired value. The stream of fine droplets forms this sharply defined core and this core is extremely stable for there is no tendency of the core to wander or stray from the point at which the wire electrode is directed. This superior result is attained with no spatter in spite of the fact that according to ordinary welding experience spattering becomes a serious problem as the current strength is increased. This unexpected result occurs only at wire feed speeds in excess of 100 inches per minute and when the current strength is adequate to project the weld metal axially from the end of the electrode.

As stated above, the negative terminal of the direct current welding generator is connected to the workpiece, thus providing reverse polarity whereby the workpiece constitutes the cathode and the electrode constitutes the anode. This use of reverse polarity is particularly advantageous where the arc is shielded by an inert gas. It has been found that under these conditions a cleaning action occurs whereby oxide coating is removed by cathode sputter (positive ion bombardment) and this insures good fusion of the deposit to the base metal. The use of reversed polarity according to this invention does not involve any objectionable overheating of the positive electrode because this electrode is fed toward the arc at such a rapid rate that such overheating does not occur. Furthermore the reverse polarity serves to concentrate heat in the base metal, thereby insuring adequate penetration.

The gas supplied from the tank 14 is preferably an inert, monatomic gas such as helium or argon. It will be understood, however, that for certain purposes it may be preferable to employ a reducing gas instead of an inert gaseous medium. Thus satisfactory results have been obtained using a steel wire electrode having a diameter of $\frac{1}{16}$ inch with a welding current of 260 amperes, the wire being fed toward the arc at a rate of approximately 165 inches per minute in a reducing atmosphere of carbon monoxide and carbon dioxide.

It has been found that a remarkably wide range of power can be used for successful welding operations in accordance with our invention, particularly where the electrode is stainless steel. Thus we have found that when using a stainless steel wire electrode the welding power may be varied throughout a range of approximately 5,000 watts whereas with conventional welding operations for the same size wire comprising a standard coated electrode, the permissible power range is in the neighborhood of only 500 watts.

It has been found that in order to obtain the best gas shielding effect at the arc, the gas should be discharged from the gas orifice in a manner to insure the production of a substantially non-turbulent envelope of gas at the welding zone. If the gas is discharged around the arc in a manner such that the velocity of the gas has any substantial circumferential or whirl velocity component, air is entrained with the shielding gas to such an extent that proper shielding does not occur. On the other hand if the gas is supplied in a manner such that its flow is in the general direction of the electrode, without any substantially circumferential or rotational flow about the electrode, the gas envelope about the arc is substantially non-turbulent and as much as 99% of the air can be excluded from the welding zone by such an envelope of gas. In the accompanying drawing the gas supply diagrammatically illustrated therein includes a conduit 13 leading from the gas supply tank to the conduit 4 which encloses the electrode wire 5. The gas flows along this conduit until it is discharged into a gas chamber in the welding head where the gas continues its passage toward the tip of the electrode with the gas flow in the general direction of the electrode. If desired, suitable baffles or a screen such as that shown at 3 in Fig. 1 may be provided within the gas duct or chamber in the welding head to break up any circumferential flow of gas that might otherwise occur and to insure axial flow of the shielding gas toward and through the orifice near the point of the electrode.

It will be understood that this invention is not limited to the specific illustrative embodiments thereof described above in detail but includes such modifications thereof as fall within the scope of the appended claims. For example, while we have illustrated and described welding apparatus including a hand gun, other types of welding heads may be employed, for in general it may be stated that the manner in which the welding head is held in proper position with respect to the workpiece may be varied to suit the particular welding application. Furthermore as indicated above, while we prefer to employ a wire feed motor that operates at constant speed, yet under some circumstances it is appropriate to employ a feed motor or wire feed mechanism that operates at a variable rate of speed, the average rate of feed of the wire electrode being at least 100 inches per minute. Also the generator or other source of welding current provides satisfactory results provided this source of current is of such nature that the welding current is high enough to consume the electrode at the rapid rate at which it is fed toward the workpiece and project the weld metal axially from the end of the electrode. The welding operation may be what is regarded as an ordinary weld, or it may be a surfacing operation.

Throughout the specification and claims it is to be understood that the term "bare wire consuming electrode" is intended to include ordinary bare wires of filler metal and also such filler wires having a light or wash coating, as distinguished from heavy flux coated electrodes. Also, "aluminum electrode" is intended to include both aluminum and its alloys.

We claim:

1. The method of electric arc welding with a bare wire aluminum electrode connected to a source of welding current, which comprises striking an arc between said electrode and a metal workpiece connected to said source, and simultaneously feeding argon to shield the arc, feeding the wire electrode toward the arc at a rate of at least 100 inches per minute, and supplying direct current from said source to the electrode and workpiece at reversed polarity and at a current density D in said electrode having a value $$D=\frac{B}{3}+C$$

where C varies from $-10$ to $+10$, D is the current density in $10^3$ amps./in.$^2$ and B is the rate of wire feed in inches per minute.

2. Apparatus for gas shielded electric arc welding with a bare wire consuming electrode, comprising means for feeding an inert gaseous medium to shield the arc between the electrode and the workpiece, means for feeding the wire electrode toward the arc at a constant rate independent of any momentary changes in the length of the arc, the said rate being at least 100 inches per minute, and means for supplying direct current to the electrode and workpiece at reversed polarity and at a strength sufficient to consume the wire electrode at said rate.

3. Semi-automatic apparatus for gas shielded electric arc welding with a bare wire consuming electrode held in a portable hand gun to be held by the operator, comprising means for supplying an inert gaseous medium to shield the arc between the electrode and the workpiece, a source of welding current, means for feeding the wire electrode toward the arc at a constant rate, relay means for controlling the supply of shielding gas and for controlling the connection of the electrode and work piece to the source of welding current, and a single pressure switch on said hand gun and connected to said relay means for energizing the same only while pressure is applied to said switch.

4. Semi-automatic apparatus for gas shielded electric arc welding with a bare wire consuming electrode held in a portable hand gun to be held by the operator, comprising means for supplying an inert gaseous medium to shield the arc between the electrode and the workpiece, a source of welding current, means for feeding the wire electrode toward the arc at a constant rate, a line switch for connecting the electrode and the workpiece to the source of welding current, a power relay for operating said line switch, a separate source of current for said power relay, a control relay, a source of low voltage current for said control relay, a manually operable switch on said hand gun connected to said low voltage source and to said control relay, and means whereby said control relay responds to operation of said manual switch to control the supply of the gaseous medium and the operation of said power relay to simultaneously supply the gaseous medium to shield the arc and connect the electrode and workpiece to the source of welding current.

5. Apparatus for electric arc welding with a bare wire consuming electrode and a metal workpiece, comprising means for feeding the wire electrode toward the workpiece at a constant rate of at least 100 inches per minute, means for supplying direct current to the electrode and workpiece at reversed polarity and at a strength sufficient to consume the wire electrode at said rate, and relay means connected across the electrode and workpiece and responsive directly to voltage at the welding arc and operable when energized to actuate said electrode feeding means, and a relay connected to said electrode and workpiece and responsive to voltage across said electrode and workpiece in excess of normal welding voltage for deenergizing said relay means.

6. Apparatus for gas shielded electric arc welding with a bare wire consuming electrode, comprising means for supplying an inert gaseous medium to shield the arc between the electrode and the workpiece, means for feeding the wire electrode toward the arc at a constant rate of at least 100 inches per minute, means for supplying direct current to the electrode and workpiece at reversed polarity and at a strength sufficient to consume the wire electrode at said rate, and relay means connected across the electrode and the workpiece and responsive directly to voltage at the welding arc and operable when energized to actuate said electrode feeding means, and a relay connected to said electrode and workpiece and responsive to voltage across said electrode and workpiece in excess of normal welding voltage for deenergizing said relay means and interrupting the supply of direct current to the electrode and workpiece.

7. Apparatus for electric arc welding with a bare wire consuming electrode and a metal workpiece comprising means for feeding the wire electrode toward the workpiece, means for supplying welding current to the electrode and workpiece at a strength sufficient to consume the wire electrode at the rate at which it is fed toward the workpiece, relay means connected across the electrode and the workpiece and operable when energized to actuate said electrode feeding means, and a relay connected to said electrode and workpiece and responsive to voltage across said electrode and workpiece in excess of the normal welding voltage for deenergizing said relay means and interrupting the supply of welding current to the electrode and workpiece.

8. A method of electric arc welding with a bare wire consuming electrode connected to a source of welding current wherein an arc is struck between said electrode and a metal workpiece connected to said source and an inert gaseous medium is simultaneously fed to shield the arc, characterized by feeding the wire electrode toward the arc at a rate of at least 100 inches per minute, and simultaneously supply direct current from said source to the electrode and workpiece at reverse polarity and at a strength sufficient to both consume the wire electrode at said rate and also project molten metal axially from the wire electrode to the workpiece in the form of a spray of fine discrete droplets within the gas shield.

9. A welding method according to claim 8 characterized by feeding the inert gaseous medium in the direction of the electrode as an annular stream surrounding the electrode and substantially free from turbulence whereby the arc is shielded by a substantially non-turbulent envelope of inert gas which excludes air from the arc.

10. A method of electric arc welding with a bare wire consuming electrode connected to a source of welding current wherein an arc is struck between said electrode and a metal workpiece connected to said source and a non-oxidizing gaseous medium is simultaneously fed to shield the arc, characterized by feeding the wire electrode toward the arc at a rate of at least 100 inches per minute, and simultaneously supplying direct current from said source to the electrode and workpiece at reverse polarity and at a strength sufficient to both consume the wire electrode at said rate and also project molten metal axially from the wire electrode to the workpiece in the form of a spray of fine discrete droplets within the gas shield, the non-oxidizing gaseous medium being selected from the group helium, argon and mixtures of carbon monoxide and carbon dioxide.

11. Apparatus for gas shielded electric arc welding with a bare wire consuming electrode comprising means for feeding an annular stream of a non-oxidizing gaseous medium in the direction of the electrode and surrounding the same to shield the arc between the electrode and the workpiece with a non-turbulent envelope of said gas to exclude air from the arc, means for feeding the wire electrode toward the arc concentrically within said stream of gas, and means for supplying direct current to the electrode and workpiece at reverse polarity and at a strength sufficient to consume the wire electrode and maintain the arc as metal is transferred from the electrode to the workpiece entirely within said envelope of gas.

12. Apparatus for gas shielded electric arc welding with a bare wire consuming electrode comprising means for feeding an annular stream of inert monatomic gas such as helium or argon in the direction of the electrode and surrounding the same to shield the arc between the electrode and the workpiece with a non-turbulent envelope of said gas to exclude air from the arc, adjustable speed means for feeding the wire electrode toward the arc concentrically within said stream of gas at an adjusted constant rate independent of any momentary changes in the length of the arc, and means for supplying direct current to the electrode and workpiece at reverse polarity and at a strength sufficient to consume the wire electrode and maintain the arc as metal is transferred from the electrode to the workpiece entirely within said envelope of gas.

ALBERT MULLER.
GLENN J. GIBSON.
NELSON E. ANDERSON.

REFERENCES CITED

The following references are of record in the file of this patent:

UNITED STATES PATENTS

| Number | Name | Date |
|---|---|---|
| 1,483,612 | Morton | Feb. 12, 1924 |
| 1,508,689 | Glasser | Sept. 16, 1924 |
| 1,746,207 | Alexander | Feb. 4, 1930 |
| 1,976,551 | Frick | Oct. 9, 1934 |
| 2,315,358 | Smith | Mar. 30, 1943 |
| 2,371,894 | Kennedy et al. | Mar. 20, 1945 |
| 2,444,834 | Landis et al. | July 6, 1948 |
| 2,465,157 | Isbell | Mar. 22, 1949 |

OTHER REFERENCES

"The Journal of the American Welding Society," June 1948, pages 431–437.